(12) United States Patent
Lee

(10) Patent No.: US 6,283,299 B1
(45) Date of Patent: Sep. 4, 2001

(54) COMPARTMENTALIZED CARRIER AND PRESENTATION BAG FOR PORTABLE TV AND VIDEO MEDIA PLAYER

(76) Inventor: Mike J. W. Lee, 15317 Lillian Pl., Hacienda Heights, CA (US) 91745

( * ) Notice: Subject to any disclaimer, the term of this patent is extended or adjusted under 35 U.S.C. 154(b) by 0 days.

(21) Appl. No.: 09/524,893

(22) Filed: Mar. 14, 2000

(51) Int. Cl.⁷ .................................................. B65D 85/38
(52) U.S. Cl. .......................................... 206/760; 206/320
(58) Field of Search ............................ 190/127; 206/305, 206/320, 576, 759, 760; 361/683; 364/708.1

(56) References Cited

U.S. PATENT DOCUMENTS

| | | | | |
|---|---|---|---|---|
| 5,437,367 | * | 8/1995 | Martin .................................... | 206/320 |
| 5,445,266 | * | 8/1995 | Prete et al. ............................ | 206/320 |
| 5,524,754 | * | 6/1996 | Hollingsworth ..................... | 206/320 |
| 5,607,054 | * | 3/1997 | Hollingsworth ..................... | 206/320 |
| 5,639,004 | * | 6/1997 | Carlton et al. ........................ | 206/320 |
| 5,647,484 | * | 7/1997 | Fleming ................................ | 206/576 |
| 5,808,865 | * | 9/1998 | Alves .................................... | 206/320 |
| 5,887,723 | * | 3/1999 | Myles et al. .......................... | 206/320 |
| 5,887,777 | * | 3/1999 | Myles et al. .......................... | 206/320 |
| 5,938,096 | * | 8/1999 | Sauer et al. ........................... | 206/320 |
| 5,971,148 | * | 10/1999 | Jackson ................................ | 206/320 |

\* cited by examiner

Primary Examiner—Jim Foster
(74) Attorney, Agent, or Firm—Leonard Tachner

(57) ABSTRACT

A compartmentalized carrier and presentation bag especially configured for housing an LCD TV and VCP and for providing a presentation apparatus for in-vehicle entertainment by orienting an LCD TV for easy viewing by back seat passengers. In a preferred embodiment, the present invention is a multiple compartment bag of generally rectangular configuration and having a main pocket for holding the VCP and a pair of side pockets, one for storing the LCD TV and the other for storing an FM transmitter for transmission of left and right audio signals to a vehicle's stereo receiver. Each end of the main compartment is closed by a full length flap releasibably secured. A significant feature of the illustrated embodiment is a unique LCD TV support along the top surface of the main compartment. The support employs a holder for housing the TV and a folding support pad which is configured to present the TV in an inclined position thereby permitting convenient rear passenger viewing when the bag is located between the vehicle's front seats.

14 Claims, 6 Drawing Sheets

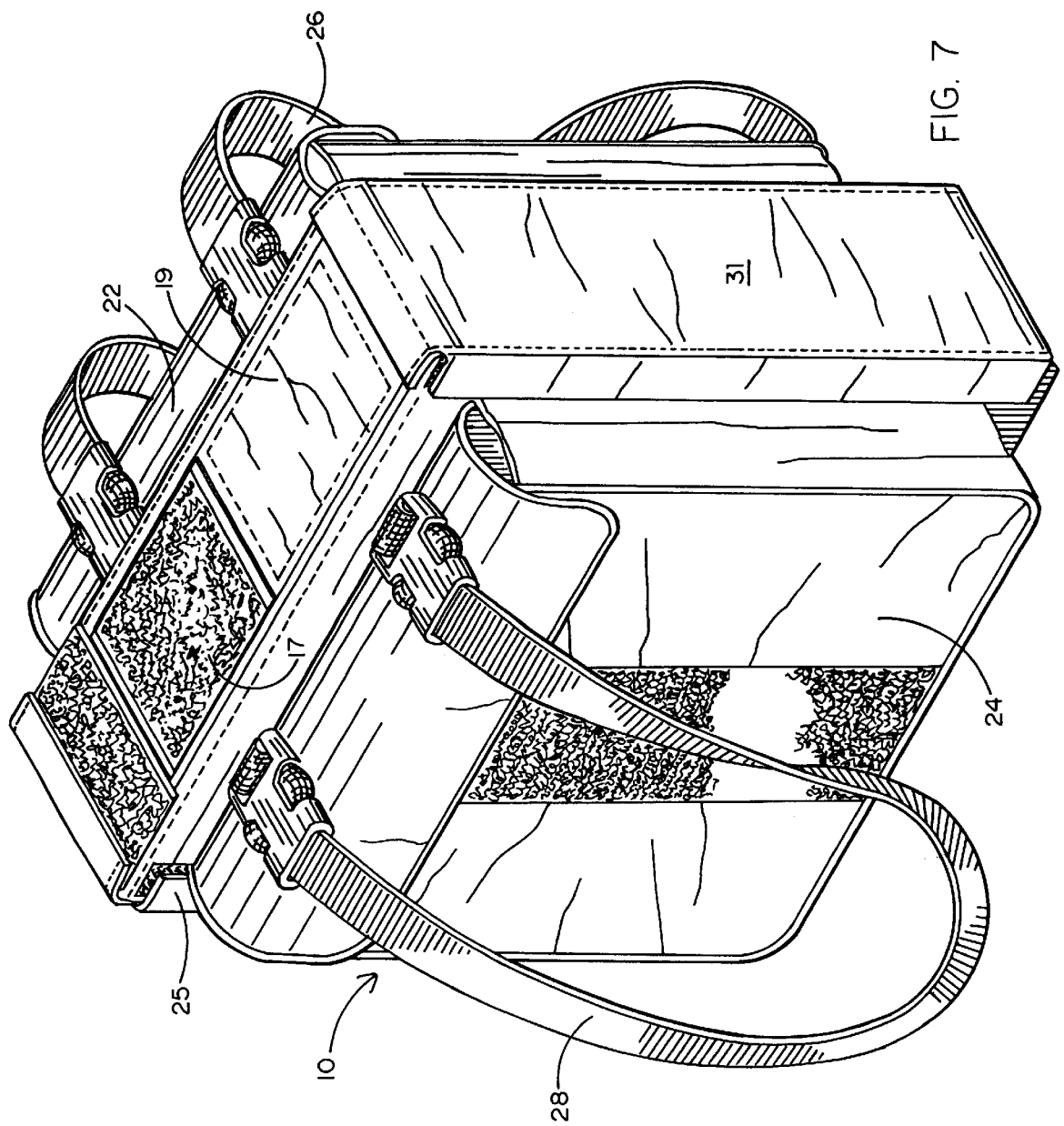

COMPARTMENTALIZED CARRIER AND PRESENTATION BAG FOR PORTABLE TV AND VIDEO MEDIA PLAYER

BACKGROUND OF THE INVENTION

1. Field of the Invention

The present invention relates generally to the field of special purpose bags or cases and more specifically, to a bag especially suited for carrying and supporting a portable television and video cassette player or DVD player for use particularly in a vehicle to entertain back seat passengers.

2. Background Art

Long distance driving trips have become an American tradition. The excellent system of roads and highways combined with more comfortable modern vehicles, has made interstate travel by car, sport utility vehicle and the like, a common feature of the family vacation. However, even at the high speeds of our most elaborate highways, travel between locations separated by hundreds or even thousands of miles can be long and arduous journeys sometimes lasting many hours or even days. Therefore, it is often desirable or even necessary to provide interesting diversions to pass the time more quickly, especially for passengers who have nothing more to do than sit and wait to reach the destination. One such diversion is watching video presentations of taped material such as full length movies or the like. Advances in electronics have made great strides in miniaturization of televisions and tape players. The use of alternative television screen technology such as liquid crystal displays (LCD) has made it practical to provide televisions which have easily visible picture sizes but yet are no bigger than a soft covered book. The miniaturization of electronics has also reduced the size of video cassette tape players (VCP) and DVD players so that they are now about the size of a woman's purse or smaller and yet are capable of receiving and playing a full size tape cassette having hours of recorded programming.

The combination of an LCD television and a VCP or DVD provide an ideal time diversion for long vehicle trips. An interesting two hour movie can help pass the time more quickly much like has been done for decades in most airliners traveling cross-country. However, because LCD TVs and VCPs are not yet normally considered original equipment by vehicle manufacturers, there has not been any useful design for containing and implementing TV and player display in a vehicle in an efficient, safe and convenient manner which readily permits viewing by rear seat passengers. Moreover, the plethora of vehicle interior layouts makes it even more difficult to provide a universal carrier for TV/VCP viewing. Therefore, it would be advantageous to provide a carrier design to both carry and deploy a TV/VCP system for vehicles of numerous different vehicle interior layouts; which safely contains the electronics and yet is capable of positioning a TV viewing screen so that it is readily seen by back seat passengers who can remain comfortably and securely seated.

SUMMARY OF THE INVENTION

The present invention comprises a compartmentalized carrier and presentation bag especially configured for housing an LCD TV and VCP and for providing a presentation apparatus for in-vehicle entertainment by orienting an LCD TV for easy viewing by back seat passengers. In a preferred embodiment, the present invention is a multiple compartment bag of generally rectangular configuration and having a main pocket for holding the VCP and a pair of side pockets, one for storing the LCD TV and the other for storing an FM transmitter for transmission of left and right audio signals to a vehicle's stereo receiver. Each end of the main compartment is closed by a full length flap releasibly secured by VELCRO® flanges. One flap provides access to the controls of the VCP and the other provides access to the rear connector panel of the VCP. A significant feature of the illustrated embodiment is a unique LCD TV support along the top surface of the main compartment. The support employs a holder having VELCRO® fasteners for housing the TV and a folding VELCRO® support pad which is configured to present the TV in an inclined position thereby permitting convenient rear passenger viewing when the bag is located between the vehicle's front seats.

OBJECTS OF THE INVENTION

It is therefore a principal object of the present invention to provide a carry and presentation bag for an LCD TV and VCP or DVD combination to facilitate viewing of recorded video in a vehicle.

It is another object of the invention to provide an apparatus for containing and presenting an LCD TV and VCP or DVD especially for use in vehicles.

It is yet another object of the invention to provide a containing and supporting apparatus for use in vehicles to present an LCD TV and VCP or DVD for viewing by rear seat passengers, the apparatus having an inclinable support platform for the TV to provide viewing direction control.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 7 is a three-dimensional view of the invention in its carrier configuration.

DETAILED DESCRIPTION OF A PREFERRED EMBODIMENT

Figure 5:
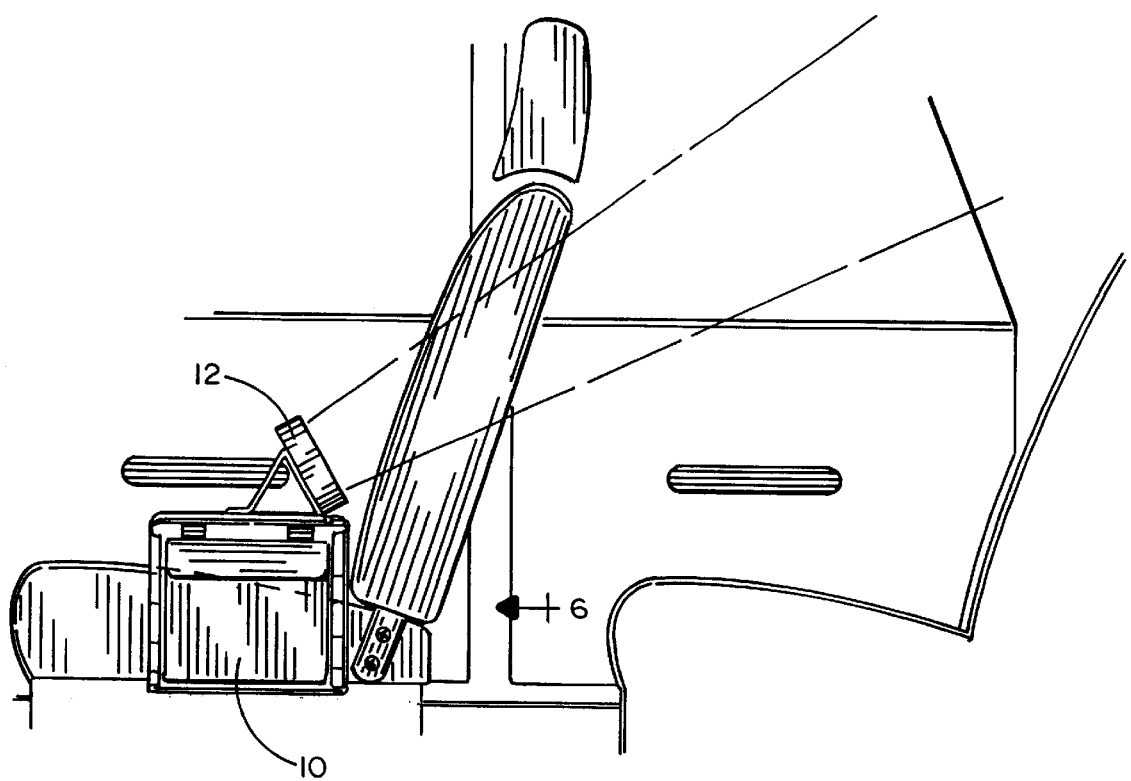
FIGS. 5 and 6 illustrate a typical vehicle location for use of the invention.
Figure 6:
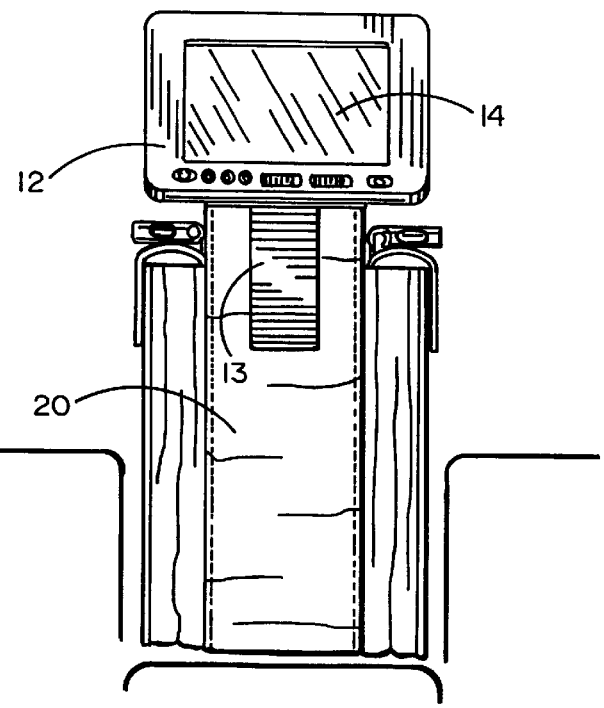

Referring to the accompanying drawings, it will be seen that an LCD TV/VCP bag 10 comprises an LCD TV holder 12 and a release strap 13 for holding and releasing LCD TV 14. In the display or viewing mode shown in FIGS. 1–3 and 6, LCD TV 14 is affixed through holder 12 to a VELCRO® pad 17 extending from a support 19, the latter being held in place by a VELCRO® base pad 16. Pad 16 is releasibly affixed to a pair of parallel VELCRO® tracks 18 having VELCRO® fasteners 23 secured to the upper surface of bag 10. LCD holder 12 has mating VELCRO® material 21 along its back surface to adhere to VELCRO® pad 17. By repositioning base pad 16 on tracks 18, the LCD TV may be placed anywhere along the top surface of bag 10 and also inclined at virtually any angle between 0 and 90 degrees relative to vertical to best accommodate viewing by rear passengers in a vehicle as shown best in FIGS. 5 and 6.

Figure 1:
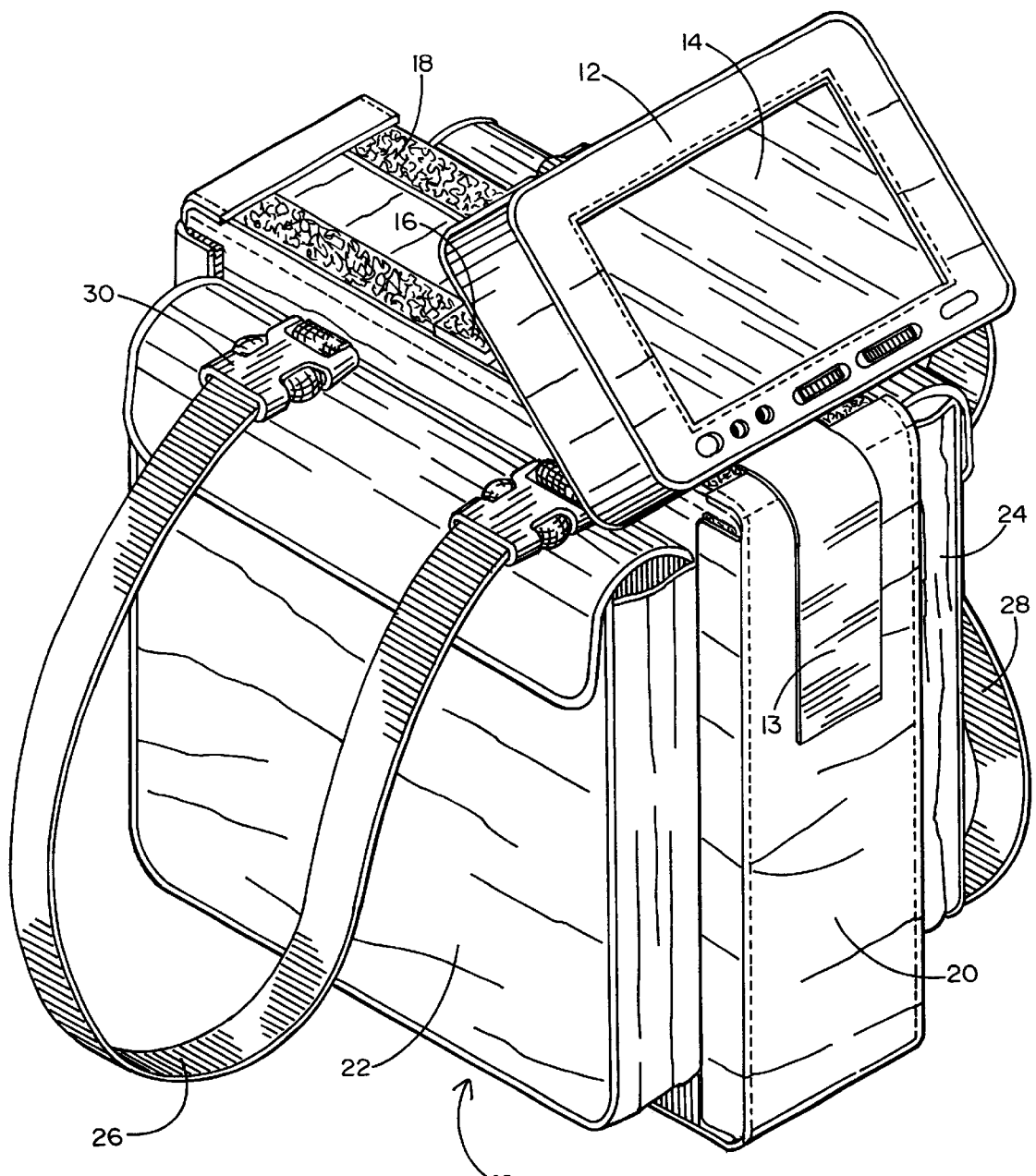
FIG. 1 is a three-dimensional view of a preferred embodiment of the invention in its LCD TV display configuration.
Figure 2:
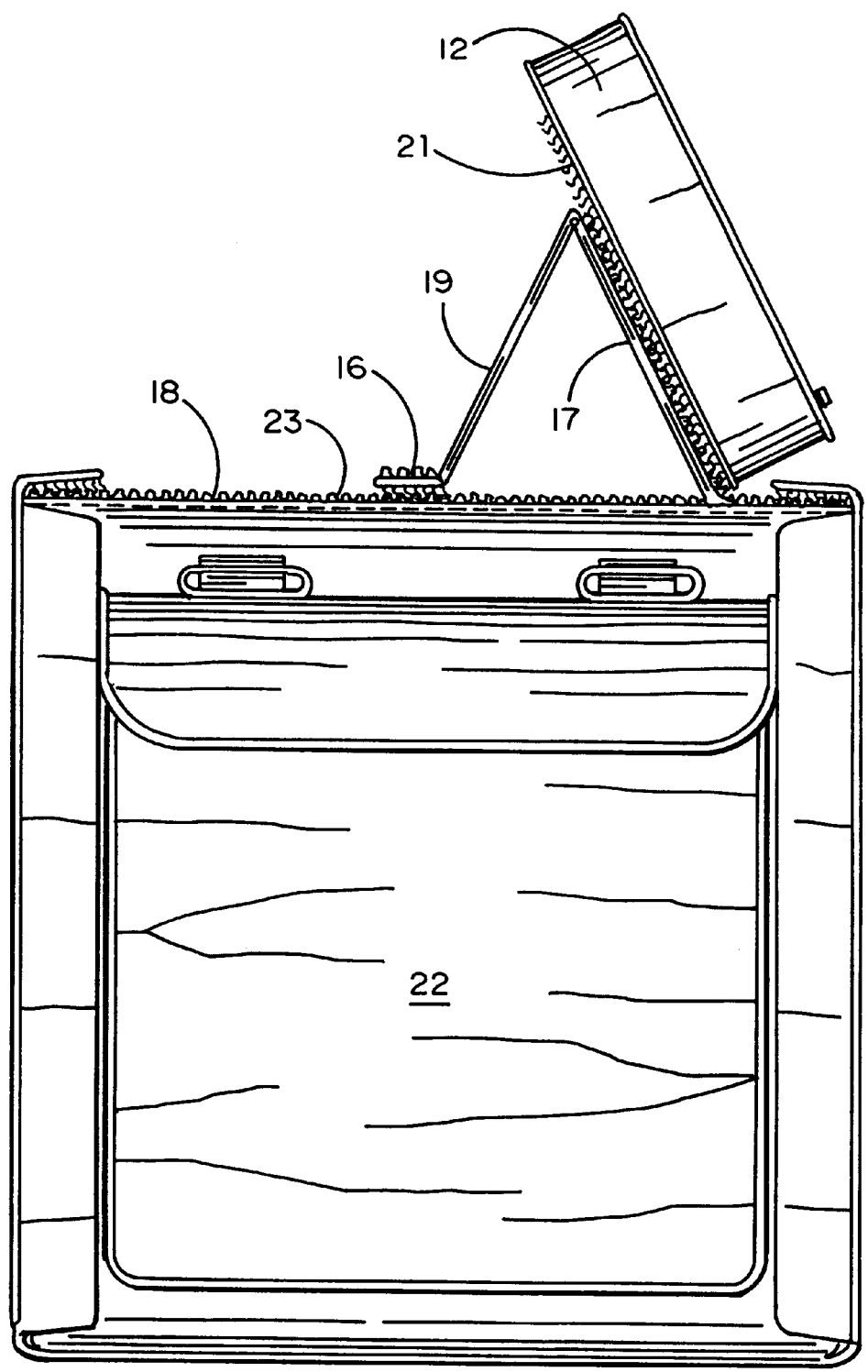
FIG. 2 is a side view of the invention in the configuration of FIG. 1.
Figure 3:
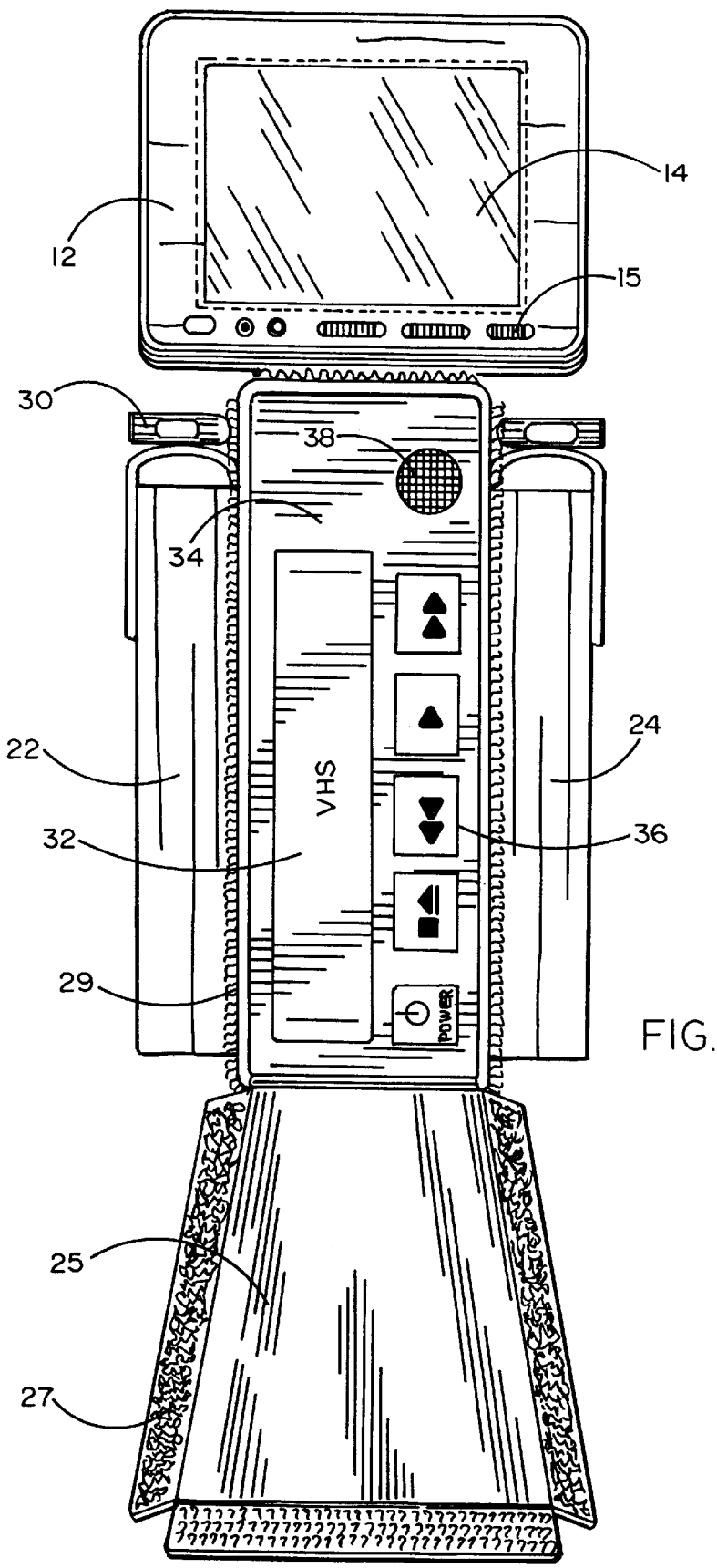
FIG. 3 is a front view of the invention in the configuration of FIG. 1 but with the end flap opened to reveal the VCP control face.

Bag 10 further comprises a main pocket 20 for holding the VCP 34 as seen in FIG. 3 and a pair of side pockets 22 and 24 for holding the LCD TV in the carry or stowed mode and for holding an FM transmitter 40 for stereo sound transmission to a vehicle's FM receiver. Side pockets 22 and 24 also store additional accessories such as cables and the like. Main pocket 20 is enclosed at its respective ends by a pair of end flaps 25 and 31 each having respective VELCRO® flanges 27 and 33. In addition, bag 10 has a pair of straps 26 and 28 releasibly connected to the bag above respective side pockets 22 and 24 by a plurality of buckles 30.

Figure 4:
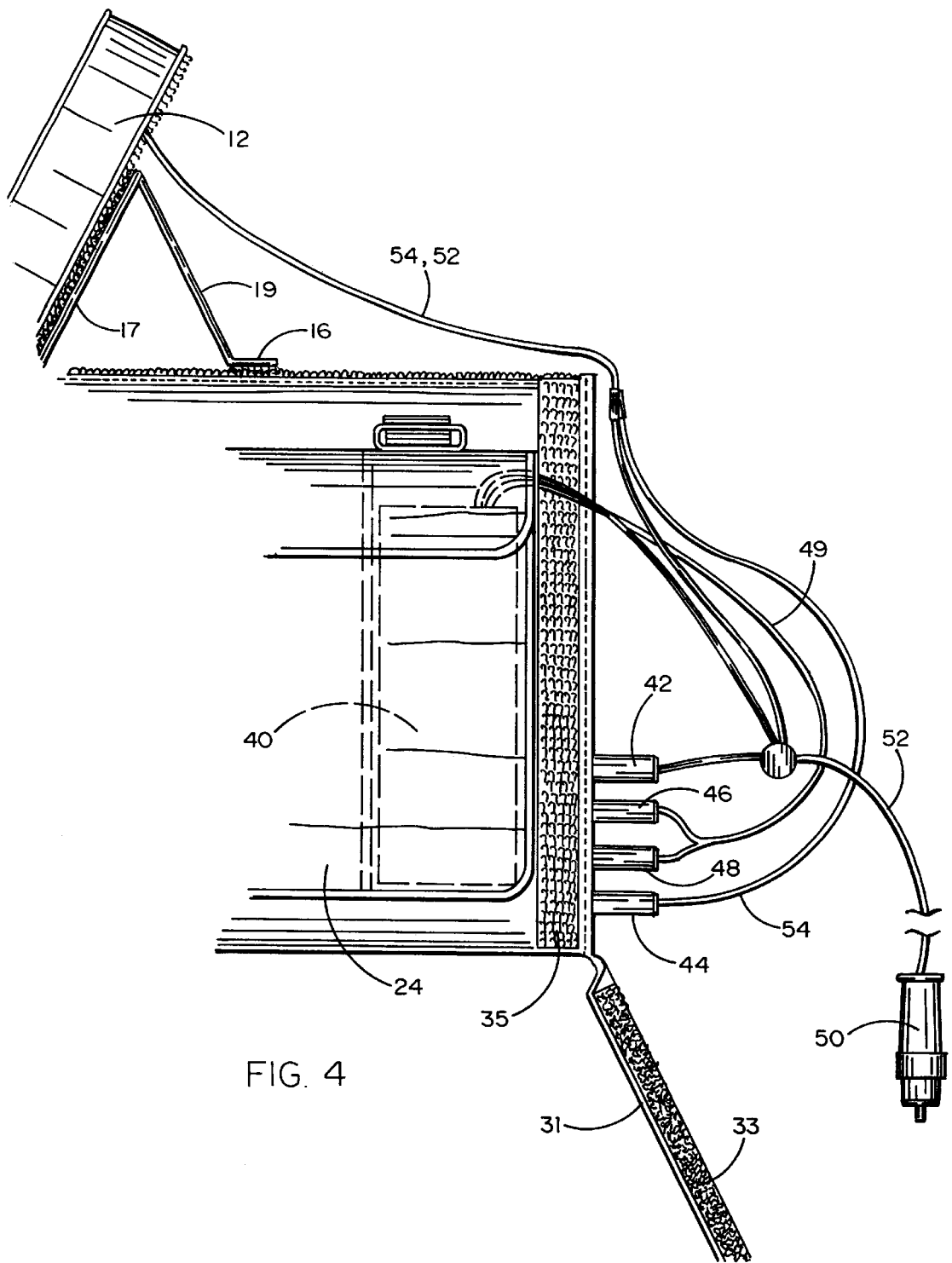
FIG. 4 is an enlarged partial side view of the invention showing the end flap removed from the rear to facilitate connections for operating the LCD TV and VCP in a vehicle.

The viewing or presentation mode of the invention may be best understood by referring to FIGS. 3–6. In FIG. 3, it will be seen that the main pocket 20 encloses the VCP 34 so that when end flap 25 is opened by releasing flanges 27 from fasteners 29, one may have access to tape compartment 32 and tape player controls 36 and reveal remote control sensor 38 for remote control operation of the VCP. Controls 15 of LCD TV 14 are also readily accessible through holder 12. As seen in FIG. 4, the opposite end of main compartment 20 is made accessible by opening end flap 31 which is accomplished by releasing flanges 33 from VELCRO® fasteners 35. Access to the back end of VCP 34 permits interconnects to be made for VCP operation. More specifically, a VCP power plug 42 is connected by power cord 52 to a power connector 50. Power cord 52 also provides DC power to FM transmitter 40 in side pocket 24 and to LCD TV 14. A video out connector 44 is connected to the LCD TV video input by a video cable 54. A pair of audio out connectors 46 and 48 (right and left channels) are connected by an audio cable 49 to the FM transmitter 40 which broadcasts stereo audio signals to a vehicle's FM stereo receiver by means of a simple antenna (not shown) which may be draped outside of pocket 24 if necessary to assure good reception.

All of the aforementioned cables, cords and connectors may be readily removed and stored in one of the side pockets 22 or 24. Moreover, LCD TV 14 and its holder 12 may be readily removed and stored as well. VELCRO® pads 16 and 17 and support 19 are then unfolded and secured along the top of main compartment 20 as seen best in FIG. 7 or may also be placed in a side pocket for storage. The resulting carry mode of the invention, with all components and accessories safe and secure within bag 10, permits convenient transport of the electronics and their accessories to another vehicle or other location. It will be understood that while a VCP is disclosed herein as the media player, a DVD player may be used instead. Thus, the generic term "video media player" is used herein to refer to both a VCP and a DVD player or any other form of video source.

Having thus disclosed a preferred embodiment of the invention, it being understood that various modifications and additions are contemplated, what is claimed is:

1. A bag for carrying and alternatively for supporting for viewing an LCD TV and a video media player to provide TV programming from a recorded video source; the bag comprising:

a compartment for enclosing said player, said compartment having selectively openable end flaps for access to controls and connectors of said player;

an LCD TV holder for receiving said LCD TV and having fastening elements for securing said LCD TV in a location rendering said LCD TV viewable for seeing said TV programming;

said compartment having an exterior surface to which a bendable support is attached for receiving said holder and LCD TV in a selectable inclined position for adjustment of a view angle for seeing said TV programming.

2. The bag recited in claim 1 further comprising at least one side compartment for receiving at least said holder and said LCD TV in a stowed mode.

3. The bag recited in claim 1 further comprising a pair of side compartments for receiving said holder, said LCD TV and accessories for interconnecting said LCD TV and said player in a viewing mode.

4. The bag recited in claim 3 wherein at least one of said side compartments is configured for receiving an FM transmitter for stereo audio generation at a remote FM receiver.

5. The bag recited in claim 1 wherein said selectable inclined position provides selectable adjustment of view angle over a range of zero to ninety degrees.

6. The bag recited in claim 1 wherein said openable end flaps are releasibly attached to said compartment by VELCRO® fasteners.

7. The bag recited in claim 1 wherein said bendable support is foldably attached to said exterior surface by VELCRO® fasteners.

8. A bag for carrying and alternatively for supporting for viewing an LCD TV and video media player to provide TV programming from a recorded video source; the bag comprising:

a compartment for enclosing said player, said compartment having selectively openable end flaps for access to controls and connectors of said player;

an LCD TV holder for receiving said LCD TV and having fastening elements for securing said LCD TV in a location within a vehicle passenger compartment rendering said LCD TV viewable to back seat passengers of said vehicle for seeing said TV programming;

said compartment having an exterior surface to which a bendable support is attached for receiving said holder and LCD TV in a selectable inclined position for adjustment of a view angle toward back seat passengers for optimally viewing said TV programming.

9. The bag recited in claim 8 further comprising at least one side compartment for receiving at least said holder and said LCD TV in a stowed mode.

10. The bag recited in claim 8 further comprising a pair of side compartments for receiving said holder, said LCD TV and accessories for interconnecting said LCD TV and said player in a viewing mode.

11. The bag recited in claim 10 wherein at least one of said side compartments is configured for receiving an FM transmitter for stereo audio generation at an FM receiver of said vehicle.

12. The bag recited in claim 8 wherein said selectable inclined position provides selectable adjustment of view angle toward said back seat passengers over a range of zero to ninety degrees.

13. The bag recited in claim 8 wherein openable end flaps are releasibly attached to said compartment by VELCRO® fasteners.

14. The bag recited in claim 8 wherein said bendable support is foldably attached to said exterior surface by VELCRO® fasteners.

* * * * *